United States Patent
Jüngling et al.

(10) Patent No.: US 12,233,693 B2
(45) Date of Patent: Feb. 25, 2025

(54) ROOF SYSTEM

(71) Applicant: Inalfa Roof Systems Group B.V., Oostrum (NL)

(72) Inventors: Rainer Gerhard Jüngling, Mönchengladbach (DE); Marcel Johan Christiaan Nellen, Merselo (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 182 days.

(21) Appl. No.: 17/865,832

(22) Filed: Jul. 15, 2022

(65) Prior Publication Data
US 2023/0026689 A1    Jan. 26, 2023

(30) Foreign Application Priority Data

Jul. 20, 2021 (EP) .................................. 21186731

(51) Int. Cl.
*B60J 7/043* (2006.01)
*B60J 7/02* (2006.01)
*B60J 7/053* (2006.01)

(52) U.S. Cl.
CPC ............. *B60J 7/022* (2013.01); *B60J 7/0435* (2013.01); *B60J 7/053* (2013.01)

(58) Field of Classification Search
CPC . B60J 7/0435; B60J 7/047; B60J 7/053; B60J 7/057; B60J 7/0573; B60J 7/022
USPC ......................................... 296/216.02–216.9
See application file for complete search history.

(56) References Cited

U.S. PATENT DOCUMENTS

| | | | |
|---|---|---|---|
| 3,066,975 A * | 12/1962 | Larche | B60J 7/04 49/452 |
| 3,873,150 A | 3/1975 | Marr et al. | |
| 4,005,901 A | 2/1977 | Lutke et al. | |
| 4,998,711 A | 3/1991 | Borg | |

(Continued)

FOREIGN PATENT DOCUMENTS

| | | | |
|---|---|---|---|
| DE | 10304506 A1 | 8/2004 | |
| DE | 102008006344 B3 | 4/2009 | |

(Continued)

OTHER PUBLICATIONS

European Search Report in corresponding European patent application No. 21186731.2 dated Jan. 18, 2022.

*Primary Examiner* — Dennis H Pedder
(74) *Attorney, Agent, or Firm* — Steven M. Koehler; Westman, Champlin & Koehler, P.A.

(57) ABSTRACT

A roof system comprises a stationary part configured for a roof opening from above. A panel is configured to close the roof opening and open the roof opening. The stationary part includes a frame extending along at least a substantial part of a circumference of the roof opening and being attached to the fixed roof of the vehicle. Guide rails extend in longitudinal direction substantially parallel to opposite sides of the roof opening and substantially within the longitudinal length of the roof opening. The guide rails are slidably supporting an operating mechanism for the panel and are attached to the frame. The guide rails extend at least partly below the frame, at least in points of attachment where the guide rails are attached on their outer sides to the frame. The points of attachment are positioned below an area adjacent the longitudinal sides of the panel, when in closed position.

15 Claims, 7 Drawing Sheets

(56) References Cited

U.S. PATENT DOCUMENTS

| | | | |
|---|---|---|---|
| 5,048,890 A * | 9/1991 | Masuda | B60J 7/022 |
| | | | 72/256 |
| 5,052,744 A | 10/1991 | Sugimoto | |
| 5,704,117 A | 1/1998 | Mok et al. | |
| 6,158,803 A | 12/2000 | Reihl et al. | |
| 6,164,718 A | 12/2000 | Stallfort | |
| 6,224,146 B1 | 5/2001 | Willard et al. | |
| 6,257,658 B1 | 7/2001 | Nabuurs et al. | |
| 6,279,989 B1 | 8/2001 | Marchart et al. | |
| 6,409,258 B1 | 6/2002 | Grimm et al. | |
| 6,457,769 B2 | 10/2002 | Hertel et al. | |
| 7,144,076 B2 | 12/2006 | Wendler et al. | |
| 7,731,275 B2 | 6/2010 | Bergmiller et al. | |
| 7,862,109 B2 | 1/2011 | Geerets | |
| 8,118,356 B2 | 2/2012 | Holzel | |
| 8,220,868 B2 | 7/2012 | Fraley | |
| 9,233,600 B2 | 1/2016 | Nellen et al. | |
| 9,266,415 B1 | 2/2016 | Nellen et al. | |
| 9,340,096 B2 | 5/2016 | Bojanowski | |
| 9,849,928 B2 | 12/2017 | Dayoub et al. | |
| 10,035,408 B2 * | 7/2018 | Crismon | B60J 7/11 |
| 10,960,742 B2 | 3/2021 | Hiramatsu | |
| 10,974,580 B2 | 4/2021 | Carlson et al. | |
| 2002/0021031 A1 | 2/2002 | Radmanic et al. | |
| 2006/0080903 A1 | 4/2006 | Grimm et al. | |
| 2011/0285181 A1 | 11/2011 | Manders | |
| 2012/0235448 A1 | 9/2012 | Grimm et al. | |
| 2013/0161983 A1 | 6/2013 | Geurts et al. | |
| 2014/0360295 A1 * | 12/2014 | Heidan | F16C 1/101 |
| | | | 74/89.2 |
| 2015/0076869 A1 | 3/2015 | Nellen et al. | |
| 2015/0123430 A1 | 5/2015 | Bojanowski | |
| 2015/0130225 A1 | 5/2015 | Sawada et al. | |
| 2016/0031301 A1 | 2/2016 | Nellen et al. | |
| 2016/0137243 A1 | 5/2016 | Dayoub et al. | |
| 2019/0299761 A1 | 10/2019 | Hirmatsu | |
| 2023/0022266 A1 | 1/2023 | Jüngling et al. | |

FOREIGN PATENT DOCUMENTS

| | | |
|---|---|---|
| DE | 102011119991 B3 | 5/2012 |
| DE | 102012100298 B3 | 6/2013 |
| EP | 0221241 A2 | 5/1987 |
| EP | 1036684 A2 | 9/2000 |
| EP | 2450210 B1 | 3/2014 |
| ES | 2462922 T3 | 5/2014 |
| GB | 384356 A | 12/1932 |
| JP | S60245540 A | 12/1985 |
| JP | 2005280529 A | 10/2005 |
| WO | 2010088951 A1 | 8/2010 |

\* cited by examiner

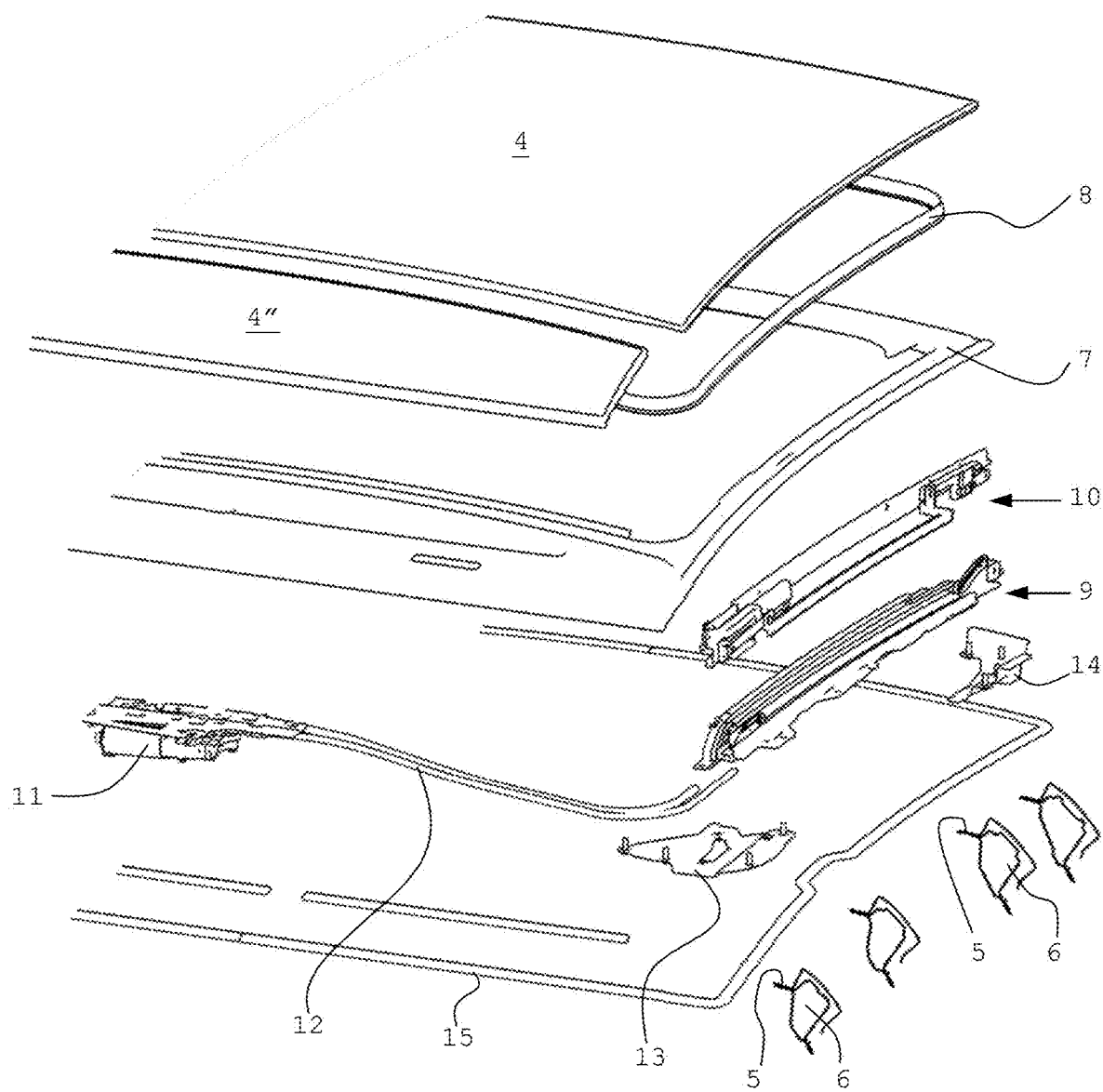

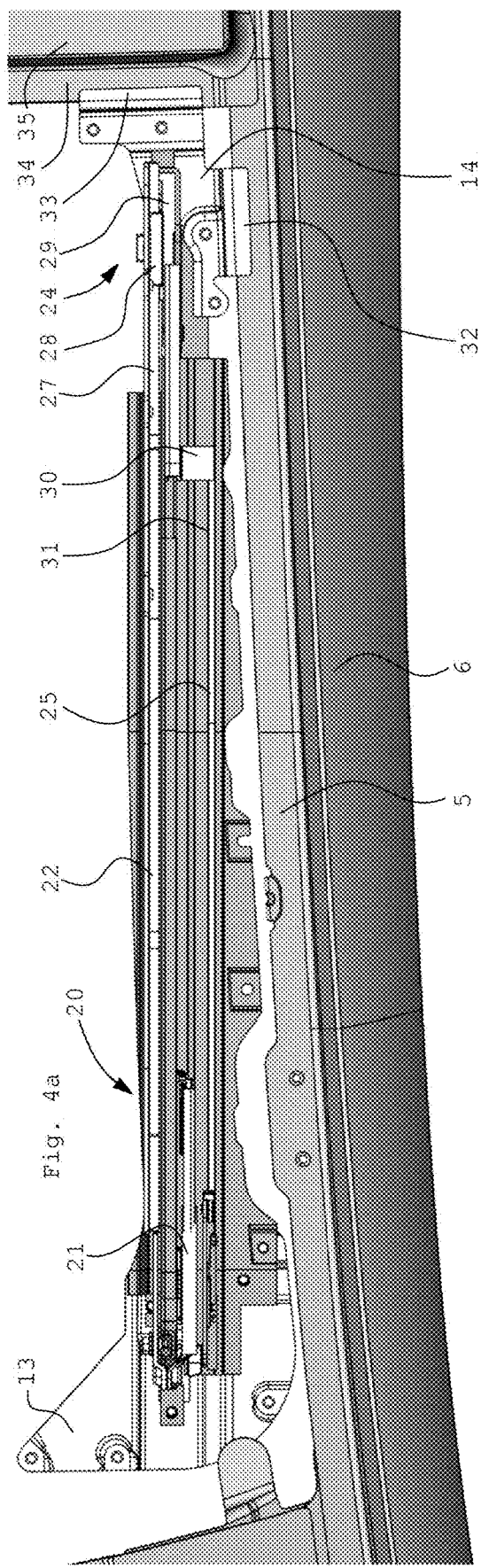
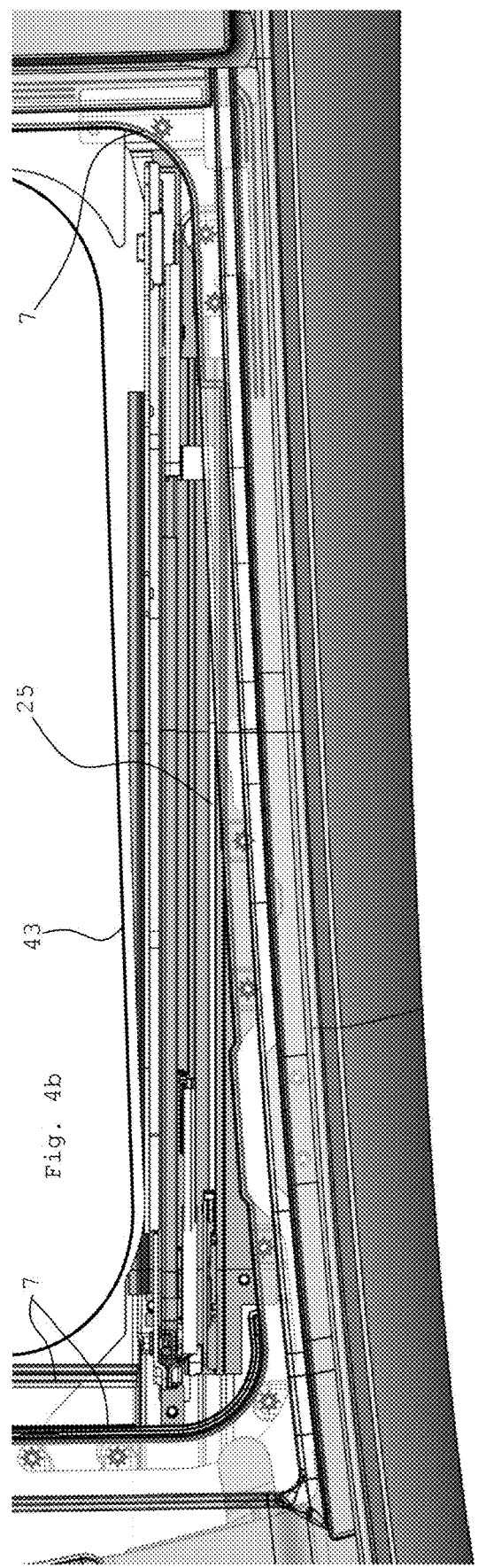

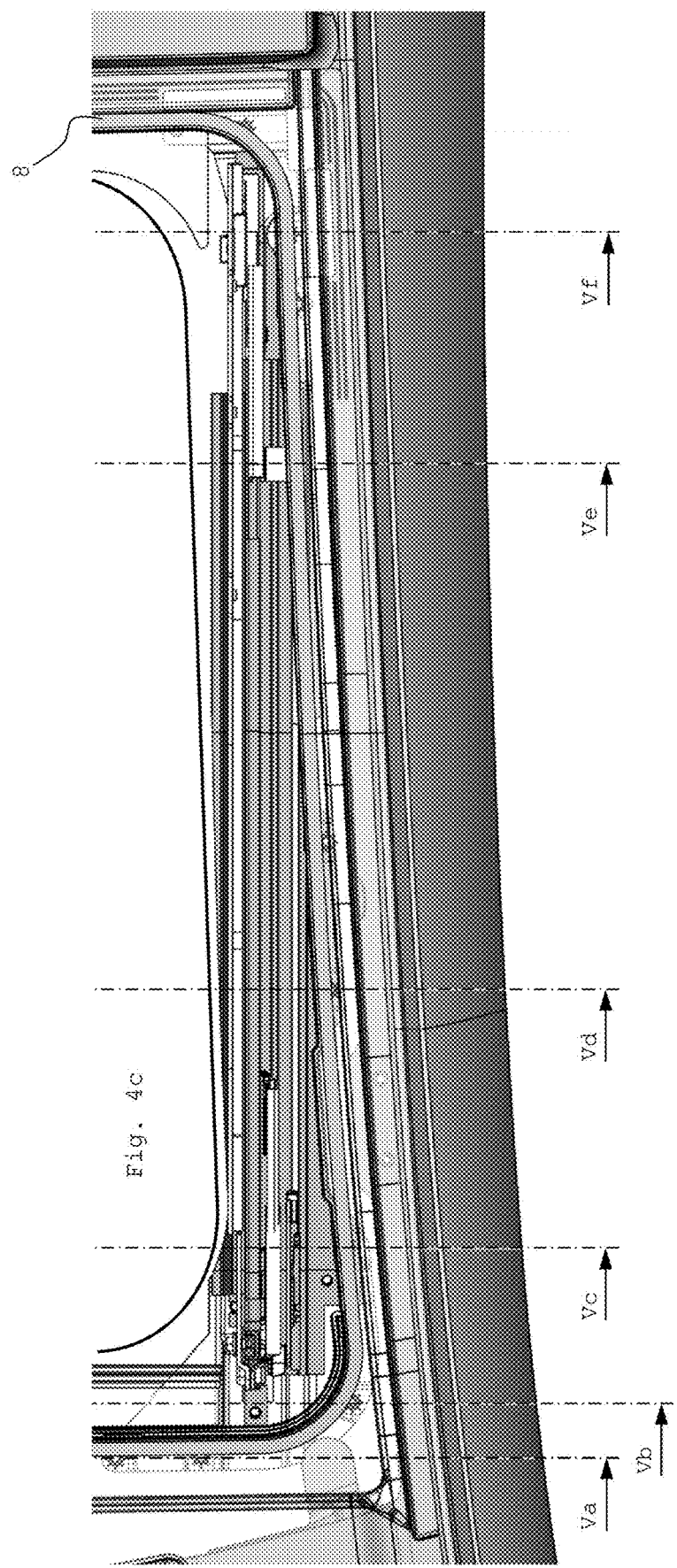

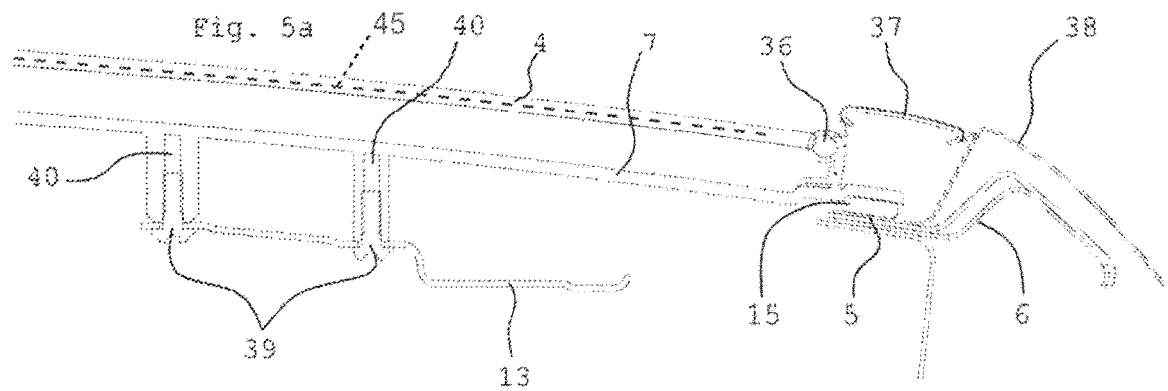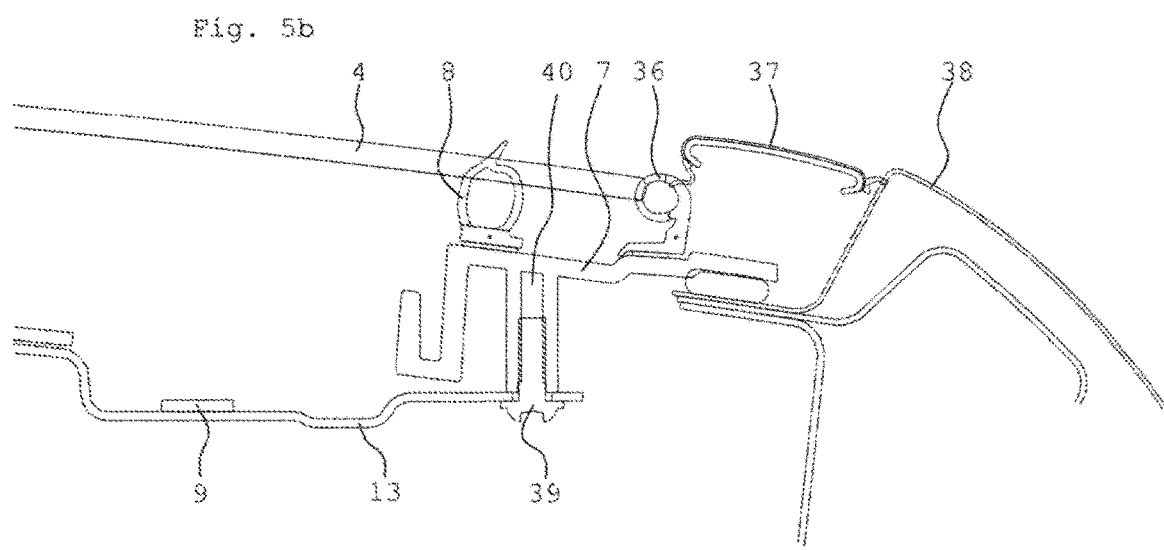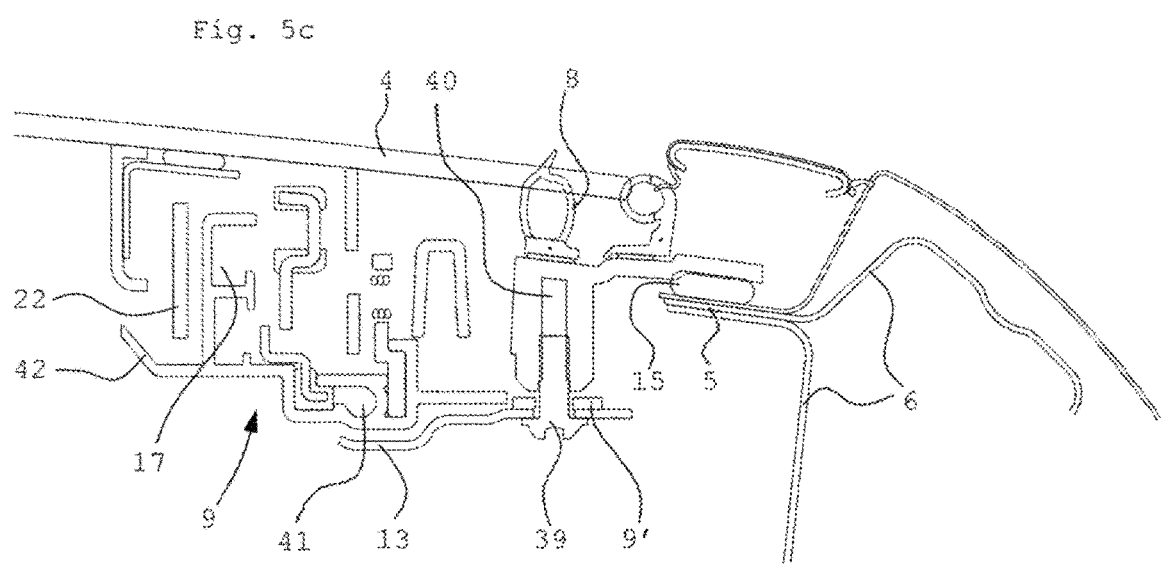

ROOF SYSTEM

BACKGROUND

The discussion below is merely provided for general background information and is not intended to be used as an aid in determining the scope of the claimed subject matter.

In modern cars there is quest for maximizing headroom and maximizing the daylight opening in roof systems.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system comprises a stationary part configured for a roof opening from above. A panel is configured to close the roof opening and open the roof opening. The stationary part includes a frame extending along at least a substantial part of a circumference of the roof opening and being attached to the fixed roof of the vehicle. Guide rails extend in longitudinal direction substantially parallel to opposite sides of the roof opening and substantially within the longitudinal length of the roof opening. The guide rails are slidably supporting an operating mechanism for the panel and are attached to the frame.

The guide rails extend at least partly below the frame, at least in points of attachment where the guide rails are attached on their outer sides to the frame. The points of attachment are positioned below an area adjacent the longitudinal sides of the panel, when in closed position.

By placing the guide rails at least partly below the frame, it is possible to position them and attach them to the frame more outwardly, i.e. away from the center of the vehicle. If the guide rails are positioned more outwardly, they will move away from the heads of the occupants of the vehicle thereby creating more headroom. Positioning the guiderails more outwardly also enable a wider daylight opening in the frame, so that this feature leads to the accomplishment of the two goals.

If the frame carries a first panel seal extending around the circumference of the panel and engaging a lower side of the panel in the closed position thereof, it is favourable if the points of attachment are positioned substantially below said first panel seal.

In case the guide rails include guide grooves for parts of the operating mechanism, in particular for a slide shoe of the operating mechanism, it is beneficial if at least one of the guide grooves, i.e., that for the slide shoe, extends at least partly in a lateral area below the first panel seal or between the first panel seal and the corresponding edge of the panel, that is at least partly below the area adjacent the local longitudinal sides of the panel.

Also, a guide groove for a drive cable of the operating mechanism may extend at least partly in said lateral area below or outside said first panel seal.

The present invention is very suitable for a roof system in which the panel is wider at its front side than at its rear side as the guide rails may then extend parallel and further below the frame at the rear than at the front. Preferably in such roof system, the operating mechanism for the panel will be such that a rear support for the panel will be more inward than a front support.

The frame may carry a second panel seal extending along and engaging at least the side edges of the panel in the closed position thereof. This second panel seal is provided to prevent or reduce the ingress of water into the area below the panel. The area between both panel seals may act as a water drain draining water outwardly to the fixed roof which can conduct water to the outside of the vehicle.

Preferably, the points of attachment each include a screwed connection which is a reliable way of connecting these parts, especially if the parts are from different materials and/or if the connection should be releasable.

The screwed connection between the guide rail and the frame is preferably oriented such that it can be tightened from below as this is the easiest way of attaching these parts.

The frame, at least at the points of attachments, may include a distance holder to position the guide rail at a desired height with respect to the fixed roof. This distance holder may be combined with a threaded hole to receive a bolt for making the screwed connection.

If the roof system comprises a sunshade system integrated in the panel, there is no need for a guide groove for the sunshade in the guide rails, which reduces the lateral dimension of the guide rails and thereby increasing the daylight opening in the roof system.

In this case, the daylight opening can be further increased if the lateral inner side of each guide rail includes a tapering along at least a part of its length to follow at least partly a tapered shaped of the fixed roof, the roof system including a head liner to cover the fixed roof and frame of the roof system from below, said headliner following the tapering of the guide rails.

BRIEF DESCRIPTION OF THE DRAWINGS

Aspects of the invention will further be explained with reference to the drawings showing an embodiment of the roof system by way of example only.

FIG. 2 is a partial exploded view of the roof system of FIG. 1 on a larger scale.

FIGS. 4a and 4b are plan views of a part of the vehicle roof of FIG. 1a without the panel, and without the frame in FIG. 4a and with the frame in FIG. 4b.

FIG. 4c is a view corresponding to that of FIG. 4b but provide with a panel seal.

FIGS. 5a-5f are enlarged sectional views along the lines Va to Vf in FIG. 4c.

DETAILED DESCRIPTION

Figure 1A:
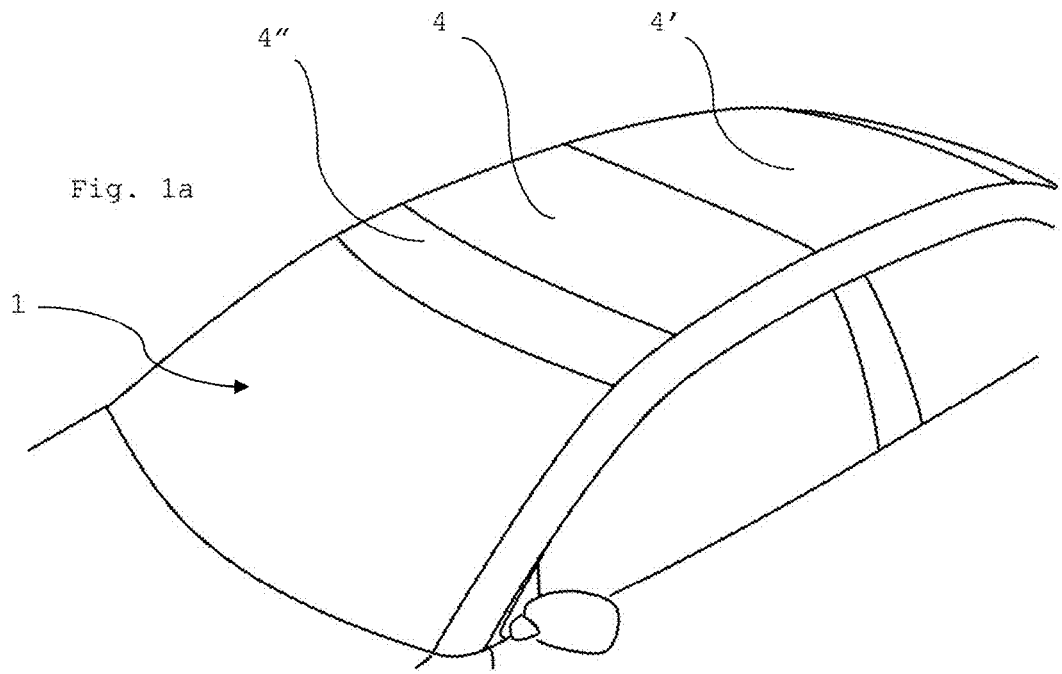
FIGS. 1a and 1b show schematic perspective views of a vehicle roof having a roof system of which the panel is shown in closed and open position, respectively.
Figure 1B:
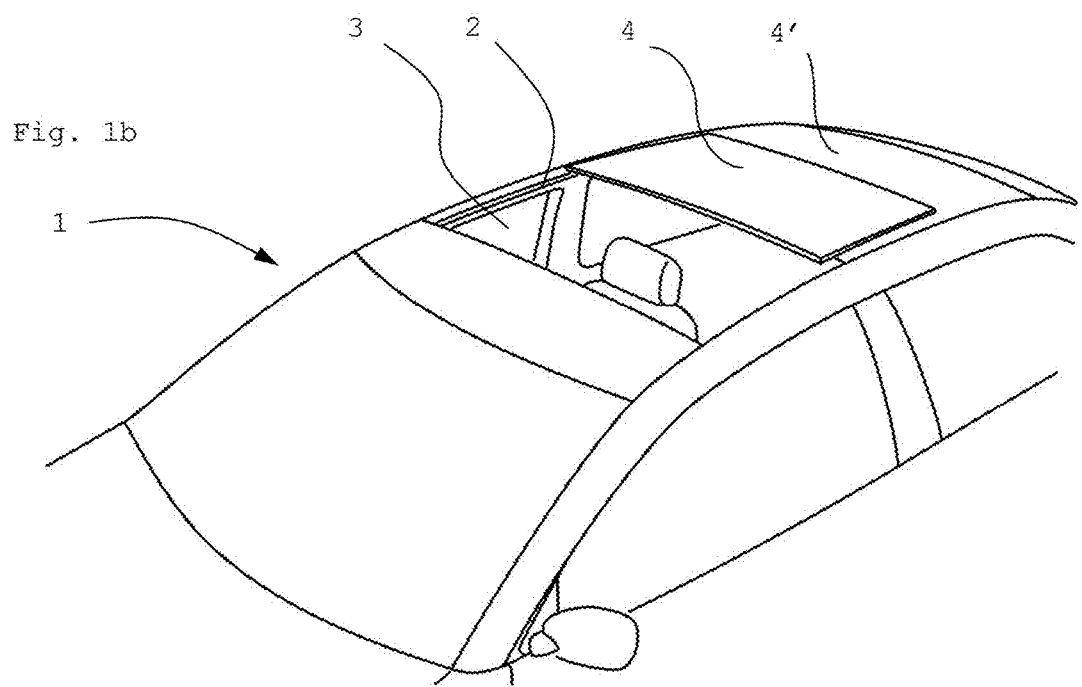

Firstly referring to FIGS. 1 and 2, a roof system is schematically illustrated. In a fixed roof 2 of a vehicle 1 a roof opening 3 is defined which can be closed (FIG. 1a) and opened (FIG. 1b) by a movable closure, here a rigid, at least partly (semi)transparent panel 4, made of glass, plastic or the like. The roof assembly may include a second panel 4' which is generally a fixed panel 4' but may also be movable as well.

The roof system is a so-called top-loaded roof system in which a stationary part of the roof system is introduced into the roof opening 3 from above, is resting on the fixed roof, normally a flange 5 of a roof beam 6, see FIG. 5. The stationary part is attached to the fixed roof 2 of the vehicle by a suitable manner, preferably gluing, but also welding and bolting would be possible, depending on the materials used.

The roof system shown here is a so-called spoiler roof in which the panel is movable from its closed position upwardly (at least with its rear side) and then rearwardly to positions above the fixed roof, or in this case above rear panel 4'. The operating mechanism, in particular the supports for panel 4, remains mainly within the roof opening, contrary to a top slider in which rear supports of the panel slide in guide rails that extend or are extended to positions behind roof opening 3.

FIG. 2 shows the main components of the roof system. It comprises panel 4 and a front cover 4", which is either stationary or movable as a wind deflector. A frame 7 forms the main component of the stationary part of the roof system. In this case frame 7 is made from plastic material by injection moulding providing great freedom of design. It carries a panel seal 8 sealing panel 4 from below. A guide rail 9 is fixed to frame 7 in longitudinal direction below each side edge of panel 4 (the opposite guide rails and all parts cooperating therewith are configured in mirror image). The length of guide rail 9 is such that it extends substantially from the front to the rear of roof opening 3. An operating mechanism 10 is connected to and guided in each guide rail 9 and an electric motor 11 is capable of driving parts of operating mechanisms 10 through drive cables 12. A front and rear reinforcement 13, 14 is fixed to frame 7 and to each guide rail 9. 15 indicates a glue strip with which frame 7 is attached to flange 5 of longitudinal roof beam 6 and flanges of cross beams (not shown here, but in FIG. 4a).

Figure 3:
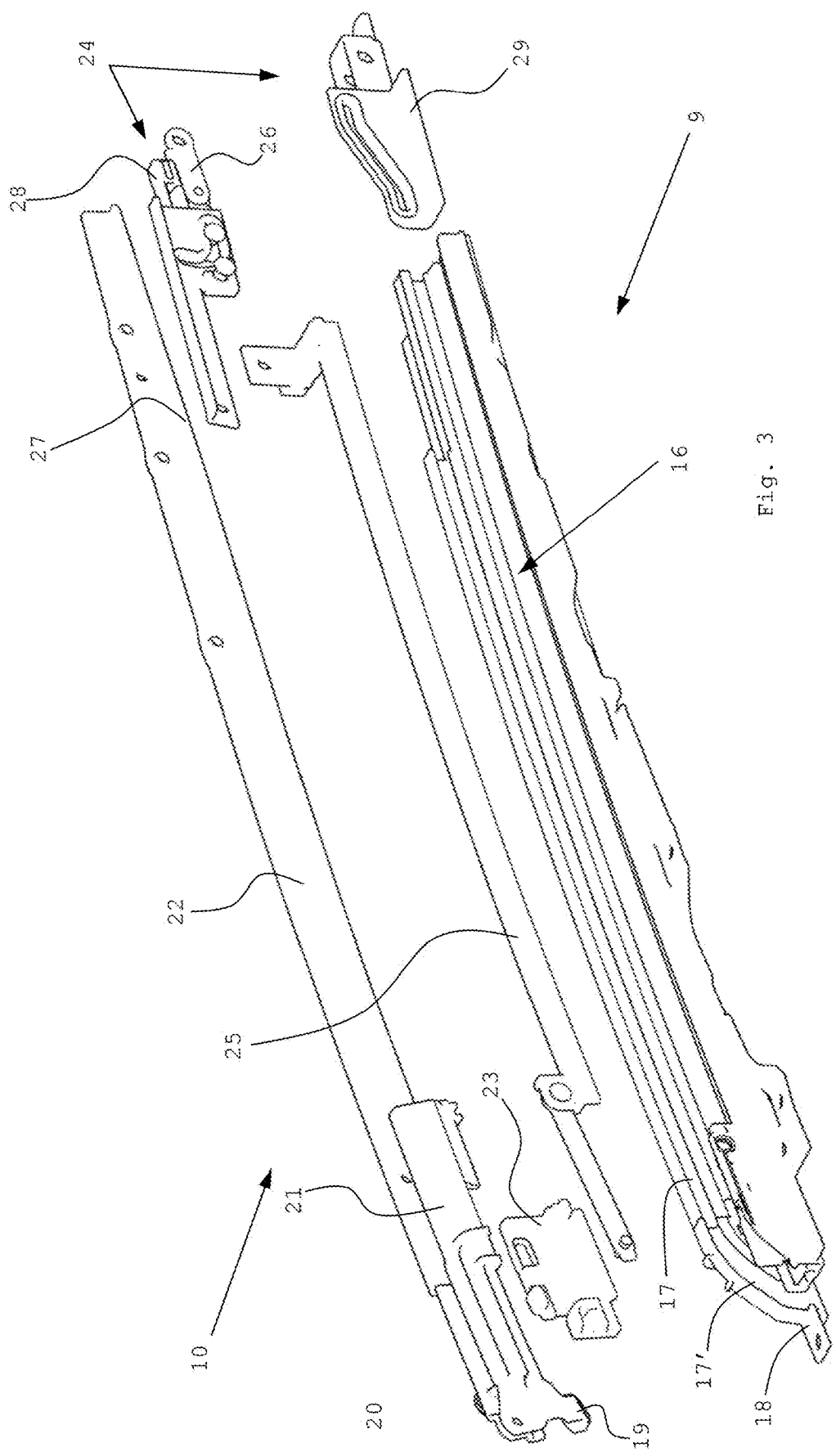
FIG. 3 is an exploded view of the parts of the operating mechanism for the panel of the roof system of FIG. 2, on a larger scale.

FIG. 3 illustrates schematically one of the guide rails 9 and operating mechanisms 10. Guide rail 9 comprises an extrusion profile 16, for example made from aluminium, having one or more guide grooves. The extrusion profile 16 is straight or slightly bent to follow the curvature of fixed roof 2 of vehicle 1. One guide groove 17 is extended to the front by an insert 18 including a downwardly curved portion 17' of guide groove 17. Guide groove 17 guides a front slide shoe 19 of a front support 20 of panel 4, here being formed by a lever 21 pivotally connected on its front end to a panel bracket 22. A driving slide 23 is attached to drive cable 12 and is controlling lever 21 on the one hand and temporarily driving rear support 24 through an elongate connecting member 25. Driving rear support 24 means moving a lever mechanism 26 such that rear support 24 moves the rear side of panel 4 upwardly to a venting position. When connecting member 25 is uncoupled from driving slide 23 when panel 4 is in its venting position a continued rearward movement of driving slide 23 will slide lever 21 of front support 20 rearwardly thereby moving panel bracket 22 rearwardly and a rear panel guide 27 thereof will be allowed to slide along a slide claw 28 of rear support 24, so that panel 4 moves with respect to rear support 24. The structure and operation of operating mechanism 10 is shown and described in more detail in the co-pending patent application EP21186741.1, the contents of which are incorporated herein by reference in its entirety.

FIG. 4 shows in a plan view more clearly that the upwardly projecting part of a fixed part 29 of rear support 24 (which is attached to extrusion profile 16 of guide rail 9) is positioned more inwardly than lever 21 of front support 20, while connecting member 25 with its rear slide shoe 30 is situated most outwardly in a guide groove 31.

FIG. 4a shows how guide rail 9 and front and rear reinforcements 13, 14 are positioned with respect to flange 5 of roof beam 6. It is shown that flange 5 extends forwardly and outwardly, so that also panel 4 is wider at its front side than at its rear side. Rear reinforcement 14, made just like front reinforcement 13 from steel sheet, is provided with flanges 32 and 33, which rest on flange 5 of longitudinal roof beam 6 and on a flange 34 of a cross beam 35.

Frame 7 is missing in FIG. 4a but is shown in FIG. 4b and it is clear that frame 7 extends above guide rail 9 in some places, especially at the rear end where tapered frame 7 is narrower. It is even extending above guide groove 31 for slide shoe 30 of connecting member 25.

FIGS. 5a-5f show the relationship between parts in different cross-sections. It also shows some further parts, not shown in FIG. 4. It shows a second panel seal 36 attached to the upper side of frame 7 and engaging the outer circumference of panel 4 in its closed position. A side cover strip 37 closes that gap between second panel seal 36 and roof skin 38 of fixed roof 2. This area between panel seal 8 and second panel seal 36 may act as a water drain collecting water seeping in beyond panel 4 and may drain water towards the area above flange 5 of roof beam 6 from where water may be drained to the outside of vehicle 1.

FIG. 5a illustrates how front reinforcement 13 is attached to frame 7 through bolts 39 screwed into threaded holes 40 in frame 7 from below. This front reinforcement is not directly attached to flange 5 of roof beam 6 or another part of fixed roof 2, but only to frame 7 and guide rail 9. A direct attachment to fixed roof 2 would be conceivable, however.

FIG. 5b shows a further attachment of front reinforcement 13 to frame 7 through bolt 39 and threaded hole 40. This connection is positioned in an area between panel seal 8 and second panel seal 36. A front protrusion of guide rail 9 is present in the cross-section of FIG. 5b.

In the cross-section of FIG. 5c, there is a further connection between front reinforcement 13 and frame 7, and now an outer flange 9' of guide rail 9 is clamped between them. This connection between frame 7 and guide rail 9 is positioned below panel seal 8.

Figure 5D:
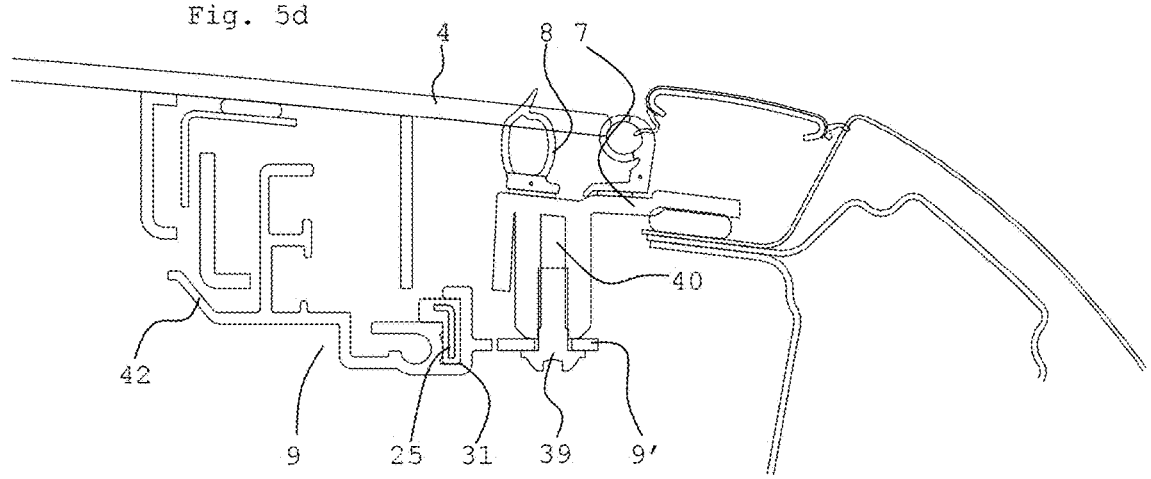

FIG. 5d illustrates a connection between outer flange 9' of guide rail 9 and frame 7 in a position behind front reinforcement 13 and in an area below panel seal 8. At this cross-section guide groove 31 for connecting member 25 is still inwardly of panel seal 8.

In the cross-section of FIG. 5e panel seal 8 is positioned closer to the center of the vehicle and roof system due to the tapered shape of fixed roof 2 and panel 4 and, as a result, guide groove 31 (which extends exactly in longitudinal direction of the roof system and vehicle) is now extending in the area below panel seal 8 or below the area between the longitudinal sides of panel 4 (when closed) and panel seal 8. Also a cable guide 41 in guide rail 9 for slidably guiding drive cable 12 is substantially below panel seal 8. The guide groove 31 is therefore positioned within the outer few centimetres of the panel edge in this cross-section. Thus, below in this context means vertically below, not just at a lower level but vertically aligned with the part below which the area is positioned.

Figure 5E:
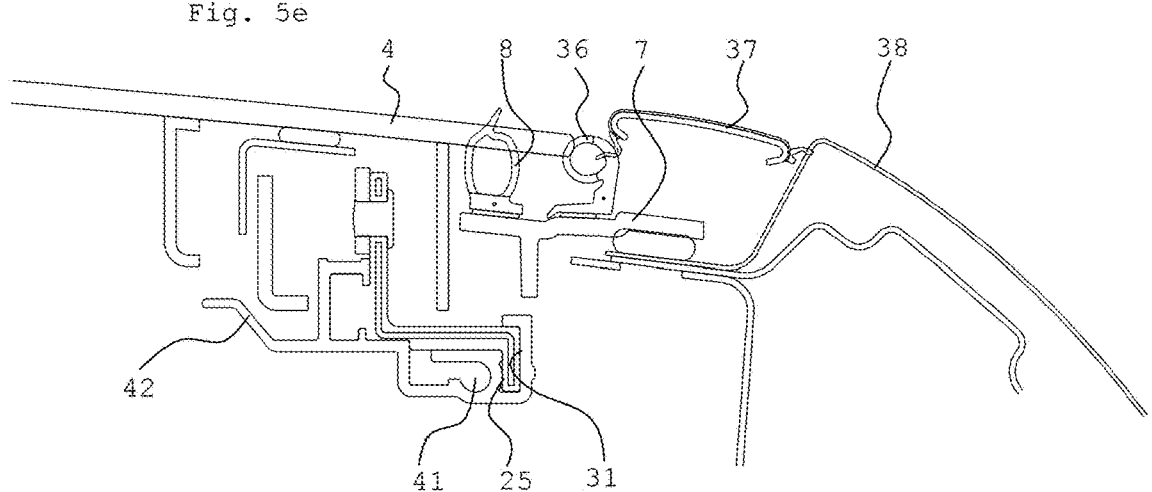
Figure 5F:
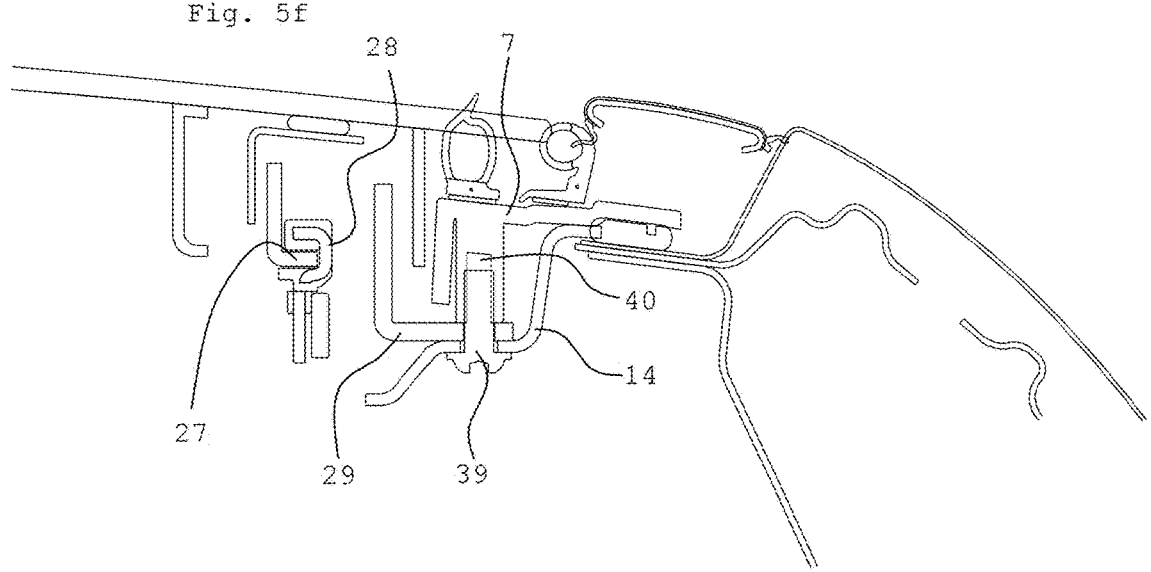

FIG. 5f shows a cross-section near the rear end of guide rail 9, in particular beyond extrusion profile 16 thereof. The cross-section includes a connection between rear reinforcement 14, frame 7 and fixed part 29 of rear support 24 in an area below panel seal 8. The parts of frame 7 which include the treaded holes 40 act as a distance holder to connect guide rail 9 at the correct height with respect to frame 7. If frame 7 is made from a plastic material, threaded holes 40 may be provided with metal inserts to receive bolts 39. This connection 39, 40 is also within the outer few centimetres of the panel edge.

FIG. 4c and a comparison of FIGS. 5c, 5d and 5e show that the inner side of guide rail 9 is tapered in its front half (where the heads of the front occupants are positioned). This is done by gradually removing a portion of an inner flange 42 in forward direction. As the front support 20 (in particular lever 21 thereof) of the operating mechanism is positioned more outwardly compared to at least the upwardly moving and/or projecting parts of rear support 24 it is possible to remove a part of said inner flange 42 of guide rail 9 such that is more or less follows the tapering of the roof. If then also a roof lining 43 (FIG. 4b) of the vehicle, also referred to as a headliner, which covers the fixed roof 2 and roof system from below, is following the tapering some additional head room and daylight opening is created.

It should be noted, if the roof system comprises a sunshade system 45 integrated in the panel 4 (as schematically illustrated in FIG. 5a), there is no need for a guide groove for the sunshade in the guide rails 9, which reduces the lateral dimension of the guide rails 9 and thereby increasing the daylight opening in the roof system.

The invention is not limited to the embodiments described before and shown in the drawings which may be varied widely within the scope of the invention as defined by the appended claims. In principle, it would be possible to combine features of the various embodiments shown and described.

What is claimed is:

1. A roof system for a vehicle having a roof opening in a fixed roof, comprising:
    a stationary part configured to be introduced into the roof opening from above and to be attached onto the fixed roof, the stationary part including a frame extending along at least a substantial part of a circumference of the roof opening and being attached to the fixed roof of the vehicle;
    a panel having longitudinal side portions with side edges having a tapered configuration wherein one side of the panel has a width, in a direction transverse to movement of the panel, that is wider than an opposite side, the panel being movably supported on the stationary part and configured to close the roof opening in a closed position and to be moved upwardly and rearwardly to an opened position in which the roof opening is at least partly opened;
    a first panel seal extending around the circumference of the panel having front and rear portions extending in the direction traverse to movement of the panel, opposed tapered side portions extending between the front and rear portions wherein curved end portions join each end of the tapered side portions to the front and rear portions, the first panel seal engaging a lower side of the panel in the closed position thereof, wherein each tapered side portion between the respective curved end portions follow the tapered configuration of the respective side edge of the panel; and
    guide rails attached to the frame and extending in a longitudinal direction substantially parallel to opposite sides of the roof opening and substantially within a longitudinal length of the roof opening, wherein the guide rails extend at least partly below the frame, at least in points of attachment where the guide rails are attached on their outer sides to the frame, said points of attachment longitudinally between the curved end portions of the first panel seal are positioned vertically below an area adjacent the longitudinal side portions of the panel and substantially below said first panel seal, when the panel is in closed position; and
    an operating mechanism for each side of opposite sides of the panel, each operating mechanism slidably supported by one of the guide rails.

2. The roof system according to claim 1, wherein the guide rails include guide grooves for parts of the operating mechanism, and at least one of the guide grooves extends at least partly vertically below the area adjacent the longitudinal sides of the panel.

3. The roof system according to claim 2, wherein a guide groove for a slide shoe of the operating mechanism extends at least partly in a lateral area vertically below or outside said first panel seal.

4. The roof system according to claim 3, wherein a guide groove for a drive cable of the operating mechanism extends at least partly in said lateral area below said first panel seal.

5. The roof system according to claim 1, wherein the guide rails include guide grooves for parts of the operating mechanism, and at least one of the guide grooves extends at least partly vertically below the area adjacent the longitudinal sides of the panel.

6. The roof system according to claim 1, wherein the panel is wider at its front side than at its rear side.

7. The roof system according to claim 1, wherein the frame carries a second panel seal extending along and engaging at least side edges of the panel in the closed position thereof.

8. The roof system according to claim 7, wherein, after the roof system has been mounted to the vehicle, a cover strip is placed between the second panel seal and the fixed roof of the vehicle.

9. The roof system according to claim 1, wherein the points of attachment each include a screwed connection.

10. The roof system according to claim 9, wherein said screwed connection being oriented such that it can be tightened from below.

11. The roof system according to claim 1, wherein the frame, at least at the points of attachment, includes a distance holder to position the guide rail at a desired height with respect to the fixed roof.

12. The roof system according to claim 1, comprising a sunshade system integrated in the panel.

13. The roof system according to claim 12, wherein the lateral inner side of each guide rail includes a tapering along at least a part of its length to follow at least partly a tapered shaped of the fixed roof, the roof system including a headliner to cover the fixed roof and frame of the roof system from below, said headliner following the tapering of the guide rails.

14. The roof system according to claim 1, wherein the guide rails are supported on at least one of their front and rear ends by separate reinforcement members attached to the frame.

15. The roof system according to claim 14, wherein the frame is made of a plastic material.

* * * * *